United States Patent
G (10) Patent No.: US 11,570,267 B2
(45) Date of Patent: Jan. 31, 2023

(54) EFFICIENT RESPONSE COMMUNICATION (71) Applicant: SAP SE, Walldorf (DE)

(72) Inventor: Nivetha G, Chennai (IN)

(73) Assignee: SAP SE, Walldorf (DE)

(*) Notice: Subject to any disclaimer, the term of this patent is extended or adjusted under 35 U.S.C. 154(b) by 156 days.

(21) Appl. No.: 17/203,449

(22) Filed: Mar. 16, 2021

(65) Prior Publication Data
US 2022/0303346 A1 Sep. 22, 2022

(51) Int. Cl.
H04L 12/58 (2006.01)
H04L 29/08 (2006.01)
H04L 67/55 (2022.01)
H04L 67/60 (2022.01)
H04L 67/562 (2022.01)

(52) U.S. Cl.
CPC ............ H04L 67/55 (2022.05); H04L 67/562 (2022.05); H04L 67/60 (2022.05)

(58) Field of Classification Search
None
See application file for complete search history.

(56) References Cited

U.S. PATENT DOCUMENTS

| | | | | |
|---|---|---|---|---|
| 8,612,530 B1* | 12/2013 | Sapovalovs | ............ | H04L 43/50 707/602 |
| 10,877,825 B2* | 12/2020 | Sullivan | .................. | G06F 9/547 |
| 2014/0177450 A1* | 6/2014 | Chou | .................. | H04L 41/0686 370/241 |
| 2015/0063129 A1* | 3/2015 | Blasinski | ............ | H04L 41/0631 370/252 |
| 2015/0310401 A1* | 10/2015 | Siracusa | ............... | H04L 67/562 705/39 |
| 2018/0212830 A1* | 7/2018 | Wagstaff | ............. | H04L 41/0893 |
| 2018/0337864 A1* | 11/2018 | Wagstaff | ............. | H04L 47/2475 |
| 2019/0089633 A1* | 3/2019 | Bhattacharjee | ....... | H04L 9/3239 |
| 2020/0097590 A1* | 3/2020 | Perrin | .................... | G06F 16/273 |
| 2021/0240853 A1* | 8/2021 | Carlson | .................. | G16H 10/20 |
| 2022/0044180 A1* | 2/2022 | Murao | ..................... | G06N 5/04 |

OTHER PUBLICATIONS

XML in Localisation: Use XLIFF to Translate Documents, https://www.maxprograms.com/articles/xliff.html.
(Continued)

Primary Examiner — Duc T Duong
(74) Attorney, Agent, or Firm — Fountainhead Law Group P.C.

(57) ABSTRACT

A message system may use publish-subscribe techniques to process messages for several applications. In situations where an application requires an output, it may need to wait for a response message back from a service via the message system. However, in certain implementations, the message system may not be able to determine that a particular message involves request-response communication. The efficient response communication techniques described herein receive the response message having a routing key and a payload including a correlation identifier and then generate a second response having a routing key that includes the correlation identifier. This message may then be efficiently routed to an application based on the correlation identifier.

20 Claims, 5 Drawing Sheets (56) References Cited

OTHER PUBLICATIONS

XLIFF-Standard File Format for Translations, https://www.k15t.com/blog/2017/06/xliff-standard-file-format-for-translations.
A Quick Guide To Understanding RabbitMQ & AMQP, https://medium.com/swlh/a-quick-guide-to-understanding-rabbitmq-amqp-ba25fdfe421d.
What is SAP Translation Hub, https://help.sap.com/viewer/ed6ce7a29bdd42169f5f0d7868bce6eb/Cloud/en-US.
AMQP 0-9-1 Model Explained, https://www.rabbitmq.com/tutorials/amqp-concepts.html.
Direct Reply-To, https://www.rabbitmq.com/direct-reply-to.html.

* cited by examiner

EFFICIENT RESPONSE COMMUNICATION

BACKGROUND

The present disclosure pertains to communication of response messages and in particular to response messages including payloads that are sent from subscriber applications to publisher applications.

Message communication systems may provide communication between applications or devices using a publish-subscribe protocol. In general, a publisher (also called a producer) is an application (or application instance) that publishes (produces) messages. In general, messaging a subscriber (also called a consumer) is an application (or application instance) that subscribes to messages and consumes those messages. The same application that consumes messages may publish messages and thus be both a publisher and a subscriber at the same time. Message communication systems may act as a broker, accepting and routing or forwarding messages from producers to different subscribers based on the attributes of the messages.

In some cases, an application may publish the message to a consumer (e.g., subscriber) service without performing further processing regarding that message. Examples for this scenario are uploading a file to cloud and updating user information in database. In such cases, there may be no backward communication from the consumer to the producer. Once the producer sends the message to the subscriber, it may continue with further processes. In other scenarios, the producer may publish a message to a consumer and it may wait for a response from the consumer in-order to continue further processing. For example, the producer may publish a request for converting a file to different format. In this example, the producer may send the file to be converted to the consumer and then wait to receive the converted file before continuing with further processing based on that file.

Remote Procedure Call (RPC) is one technique that may enable the producer to wait for the response from the consumer. However, one drawback of RPC is that it requires both the sender and the receiver to sync to achieve the request-response communication. Furthermore, there may be a situation where the message system is not aware that it should perform request-response communication.

As such, there is a need for improved request-response communication. The present disclosure addresses these issues and others, as further described below.

SUMMARY

One embodiment provides a computer system comprising one or more processors and one or more machine-readable medium coupled to the one or more processors. The one or more machine-readable medium storing computer program code comprising sets of instructions executable by the one or more processors. The sets of instructions executable to receive, from a subscriber application, a first response message including a first response routing key and a response payload including a correlation identifier. The first response message responsive to a first request message including the correlation identifier from a first producer application. The sets of instructions further executable to parse the response payload of the response message to obtain the correlation identifier. The sets of instructions further executable to generate a second response routing key including the correlation identifier. The sets of instructions further executable to generate a second response message including the second response routing key and the response payload. The sets of instructions further executable to send the second response message to a first message system that routes the second response message to the first producer application based on the second response routing key including the correlation identifier.

Another embodiment provides one or more non-transitory computer-readable medium storing computer program code. The computer program code comprising sets of instructions to receive, from a subscriber application, a first response message including a first response routing key and a response payload including a correlation identifier. The first response message being responsive to a first request message including the correlation identifier from a first producer application. The computer program code further comprising sets of instructions to parse the response payload of the response message to obtain the correlation identifier. The computer program code further comprising sets of instructions to generate a second response routing key including the correlation identifier. The computer program code further comprising sets of instructions to generate a second response message including the second response routing key and the response payload. The computer program code further comprising sets of instructions to send the second response message to a first message system that routes the second response message to the first producer application based on the second response routing key including the correlation identifier.

Another embodiments provides a computer-implemented method. The method comprises receiving, from a subscriber application, a first response message including a first response routing key and a response payload including a correlation identifier. The first response message may be responsive to a first request message including the correlation identifier from a first producer application. The method may further comprise parsing the response payload of the response message to obtain the correlation identifier. The method may further comprise generating a second response routing key including the correlation identifier. The method may further comprise generating a second response message including the second response routing key and the response payload. The method may further comprise sending the second response message to a first message system that routes the second response message to the first producer application based on the second response routing key including the correlation identifier.

The following detailed description and accompanying drawings provide a better understanding of the nature and advantages of the present disclosure.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident, based on the language of the different claims, that the claimed subject matter may include some or all of the features in these examples, alone or in combination, and may further include modifications and equivalents of the features and techniques described herein.

In the figures and their corresponding description, while certain elements may be depicted as separate components, in some instances one or more of the components may be combined into a single device or system. Likewise, although certain functionality may be described as being performed by a single element or component within the system, the functionality may in some instances be performed by multiple components or elements working together in a functionally coordinated manner. In addition, hardwired circuitry may be used independently or in combination with software instructions to implement the techniques described in this disclosure. The described functionality may be performed by custom hardware components containing hardwired logic for performing operations, or by any combination of computer hardware and programmed computer components. The embodiments described in this disclosure are not limited to any specific combination of hardware circuitry or software. The embodiments can also be practiced in distributed computing environments where operations are performed by remote data processing devices or systems that are linked through one or more wired or wireless networks. Furthermore, the terms "first," "second," "third," "fourth," etc., used herein do not necessarily indicate an ordering or sequence unless indicated. These terms may merely be used for differentiation between different objects or elements without specifying an order.

As mentioned above, message communication systems may provide communication between applications or devices using a publish-subscribe protocol. In general, a publisher (also called a producer) is an application (or application instance) that publishes (produces) messages. In general, messaging a subscriber (also called a consumer) is an application (or application instance) that subscribes to messages and consumes those messages. The same application that consumes messages may publish messages and thus be both a publisher and a subscriber at the same time. Message communication systems may act as a broker, accepting and routing or forwarding messages from producers to different subscribers based on the attributes of the messages.

In some cases, an application may publish the message to a consumer (e.g., subscriber) service without performing further processing regarding that message. Examples for this scenario are uploading a file to cloud and updating user information in database. In such cases, there may be no backward communication from the consumer to the producer. Once the producer sends the message to the subscriber, it may continue with further processes. In other scenarios, the producer may publish a message to a consumer and it may wait for a response from the consumer in-order to continue further processing. For example, the producer may publish a request for converting a file to different format. In this example, the producer may send the file to be converted to the consumer and then wait to receive the converted file before continuing with further processing based on that file.

A Remote Procedure Call (RPC) technique may enable the producer to wait for the response from the consumer. However, one drawbacks of RPC is that it requires both the sender and the receiver to be on sync to achieve the request-response communication. Furthermore, there may be a situation where the message system is not aware that it should perform request-response communications.

Given the drawbacks of using RPC, more efficient response communication techniques are needed. The present disclosure describes an intermediary service in communication with message systems that provides efficient response communication. The intermediary service can modify response messages from consumers such that they may be efficiently routed to the corresponding producer by the message system. With the efficient response communication techniques described herein, the producer application publishes a request message to the message system and receives the response from the consumer via the message system while using a correlation identifier ("CorrelationId") in the message payload to match the request and response in the payload.

In some embodiments, the producer may to bind an auto delete queue to an exchange of a message system. An auto delete queue may be a queue that is deleted when last consumer unsubscribes. Queues are further described below. The exchange may will process messages from the consumers until it receives a response message having a correlation identifier that matches the correlation identifier of the request message that the producer previously sent. The correlation identifier may be included in the payload of the request message and the response message. In some embodiments, the payload may be a nested JavaScript Object Notation (JSON) string. The efficient response communication technique described herein may not need to parse the payload to determine whether there is a matching correlation identifier for each and every message of the queue, as in other solutions, since that would waste computing resources and time in situations where there are multiple instances of the application each publishing requests and receiving responses.

Instead, to improve response communication efficiency, the message can be routed from the message system to an intermediate system, which modifies the message and then sends it to another exchange using the correlation identifier as at least a part of the binding key. In this configuration, only the queue that is bound to the exchange using the correlation identifier as the binding key will receive the message, instead of all the queues receiving and processing the message. Features and advantages of providing the intermediary service is that inefficient parsing and processing of the response message by application instances that did not send the corresponding request message may be avoided.

One exemplary application that may implement the efficient response communication techniques described herein is a translation application that provides localization and translation of texts. For instance, the translation application may be part of a platform or hub that enables user to translate their user interface texts using a repository of translations and terminology as well as machine translation. The conversion services may convert translatable files in various input formats to eXtensible Markup Language (XML) Localization Interchange File Format (XLIFF). The conversion service may also merge translations back into the original file format. Communication between the conversion service and other components of the translation platform may be performed using a message system as described herein. In some embodiments, the message system may be implemented using the Advanced Message Queuing Protocol (AMQP).

Figure 1:
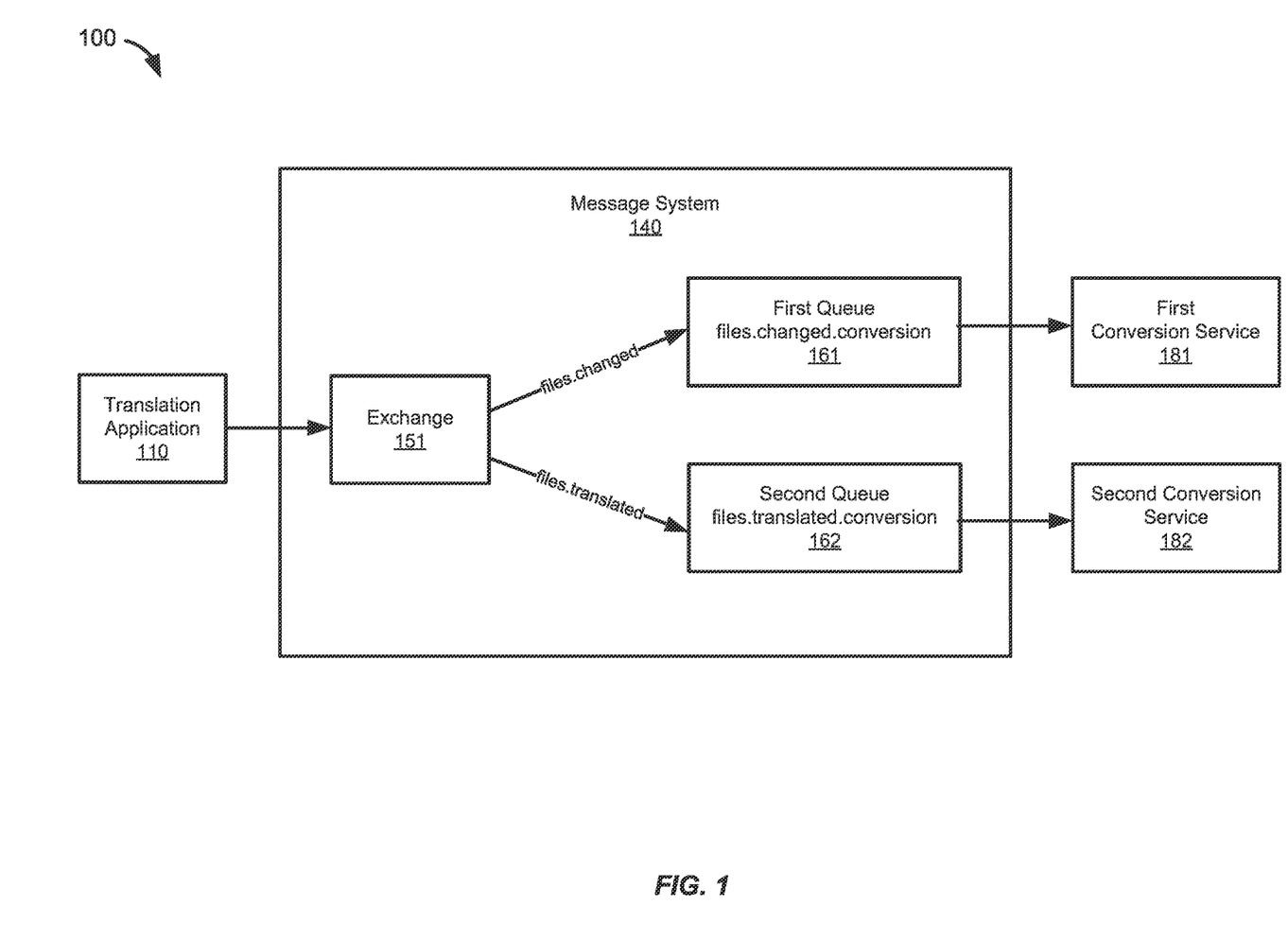
FIG. 1 shows a diagram of a translation application publishing messages to conversion services using a message system, according to an embodiment.

FIG. 1 shows a diagram 100 of a translation application 110 publishing messages to conversion services 181, 182 using a message system 140, according to an embodiment. In FIG. 1, the translation application 110 publishes a request message to the message system 140. The request message includes a routing key and a payload. The routing key may be used to route the message to a particular conversion service and the payload may contain the data to be converted. The message system 140 includes an exchange 151. An "exchange" generally refers to a service that receives messages from producers and then other side it pushes them to queues. The exchange 151 may route messages to different queues depending on the routing key of the message. Depending on the configuration of the exchange 151, it may append the message to a particular queue or it may append the message to a plurality of queues. The rules for routing messages may be defined by the exchange type (e.g., direct, topic, header, and fanout).

A "queue" generally refers to a temporary storage for messages inside the message system. The queues act like a message buffer. Many producers can send messages that go to one queue, and many consumers may try to receive data from one queue. A "binding" is a relationship between an exchange and a queue. A queue being bound to an exchange indicates that the queue is interested in certain messages from this exchange. Bindings may have a binding key parameter that may be used to route messages differently depending on the exchange type.

The exchange 151 of the message system 140 receives the request message from the translation application 110. The message system 140 includes a first queue 161 (named files.changed.conversion) and a second queue 162 (named files.translated.conversion). The first and second queues 161, 162 may bind with the exchange 151 using particular binding keys. For instance, the first queue 161 may bind with the exchange 151 using "filed.changed" as the binding key and the second queue 162 may bind with the exchange 151 using "files translated" as the binding key. Accordingly, if the translation application 110 publishes a message with "files.changed" as the routing key of the message, then the exchange 151 may route that message to the first queue 151 such that it may be received and consumed by the first conversion service 181. Similarly, if the translation application 110 publishes a message with "files.translated" as the routing key of the message, then the exchange 151 may route the message to the second queue 162 such that it may be received and consumed by the second conversion service 182. In this example, the "files.changed" may be used for converting original document to XLIFF format and the "files.translated" may be used for merging the translated content back to original file format.

The request message published by the producer is discussed above with response to FIG. 1. The request messages from the translation application of FIG. 1 include a payload for conversion by the conversion services. Accordingly, after the conversion service has consumed the message and converted the text included in the payload, a response message including the converted text may be sent back to the translation application.

Figure 2:
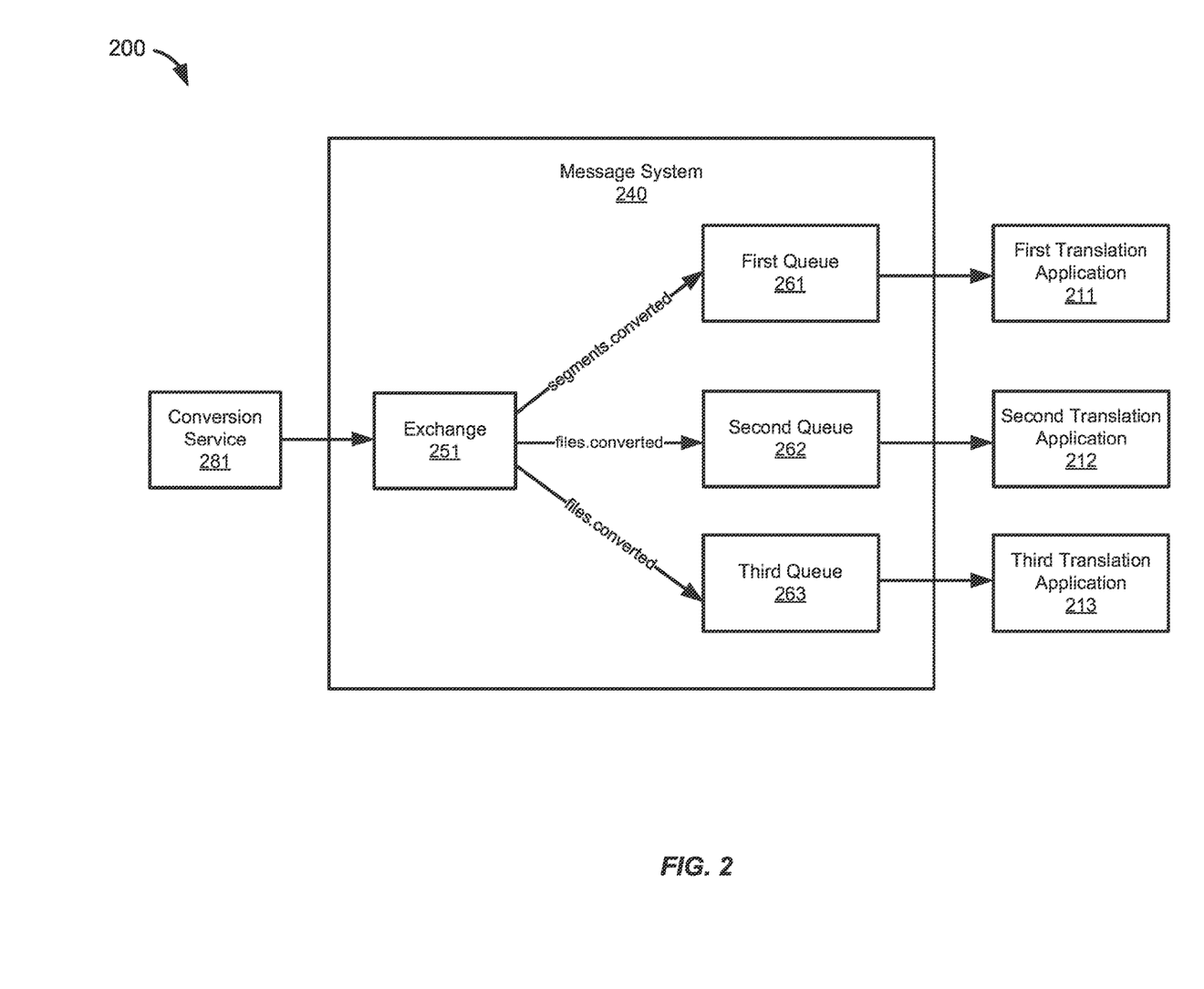
FIG. 2 shows a diagram of a conversion service sending response messages to multiple translation applications using a message system, according to an embodiment.

FIG. 2 shows a diagram 200 of a conversion service 281 sending response messages to multiple translation applications 211, 212, 213 using a message system 240, according to an embodiment. The message system 240 includes an exchange 251, a first queue 261, a second queue 262, and a third queue 263. The exchange 251 and the queues 261, 262, and 263 may be configured to operate similar to the queues discussed above.

The first queue 261 may bind with the exchange 251 using "segments.converted" as the binding key while the second queue 262 and the third queue 263 may each bind with the exchange 151 using "files.converted" as the binding key. The first queue 261, second queue 262, and third queue 263 are configured to provide messages, respectively, to a first translations application 211, a second translation application 212, and a third translation application 213. Accordingly, if a message has "segments.converted" as the routing key, then the exchange 251 may route that message to the first queue 251 such that it may be received and consumed by the first translation application 211. If a message has "files.converted" as the routing key, then the exchange 251 may route that message to either the second queue 262 or the third queue 263 such that it may be received and consumed by either the second translation application 212 or the third translation application 213. As further discussed below, a correlation identifier may also be used to route the messages.

In one example, the conversion service 281 has already received and consumed a request message from a producer. Then the conversion service 281 may send a response message including converted text back to the corresponding translation application. The text having been originally sent in the request via the message system 240. When receiving a message from the conversion service, it would be efficient if the translation applications 211, 212, 213 only received responses that are relevant to the requests that they sent, thereby avoiding wasteful and time consuming processing of irrelevant messages. For example, if the first translation application 211 sends request to convert the file named "TrnslFile1," it should receive the XLIFF format for "TrnslFile1." The translation applications 211, 212, 213 should not receive responses that are created by other instances of the application since this leads to inefficiencies when parsing the payloads to determine whether the correlation identifiers match, as discussed above. The correlation identifier may be sent as part of message payload while sending the request message and the conversion service sends the same correlation identifier back in the payload of the response message.

Without the efficient response communication techniques described herein, in order for the applications to receive the corresponding response for the request message that they sent, the applications may need to parse or extract the correlation identifier in every instance of the application. As the correlation identifier is sent in the payload (e.g., as JSON string) it takes time to parse the response and extract the correlation identifier from the payload. Since the application may only need responses to its own request messages, it may be wasteful and inefficient to process and search all the messages in order to receive the corresponding message that it requires to continue with its processing. This process will be time consuming and resource consuming as the same message will be processed by multiple instances of the application. Efficient response communication is further described below with response to FIGS. 3 and 4.

Figure 3:
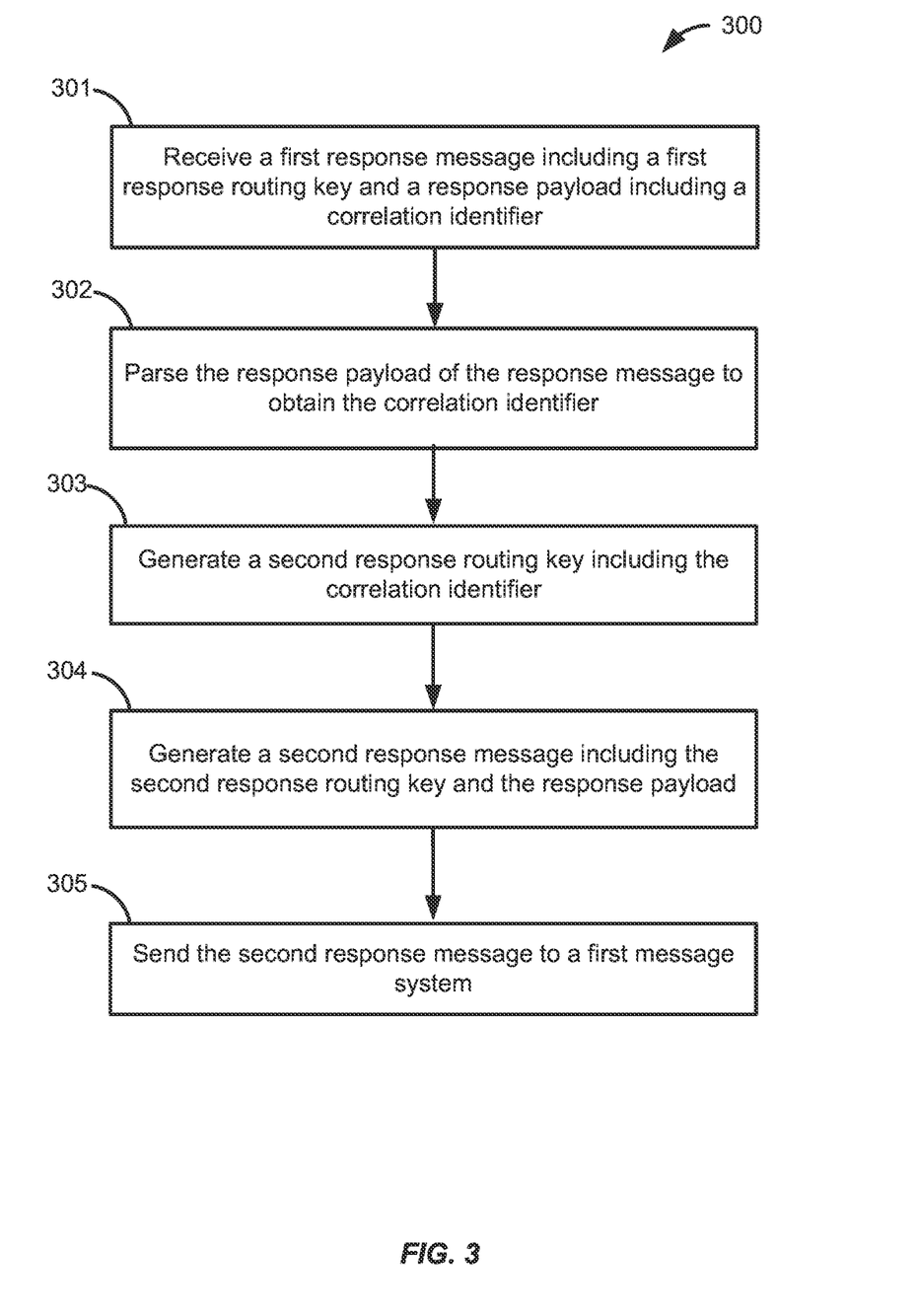
FIG. 3 shows a flowchart of a computer-implemented method for efficient response communication, according to an embodiment.

FIG. 3 shows a flowchart 300 of a computer-implemented method for efficient response communication, according to an embodiment. The method may be implemented by an intermediate service as described here. In some embodiments, the intermediate service may be part of a same computer system that implements the message systems.

At 301, the method receives, from a subscriber application, a first response message including a first response routing key and a response payload including a correlation identifier. The first response message may be responsive to a first request message including the correlation identifier from a first producer application. As discussed above, a request message may include text to be converted or translated and the response message may include the converted or translated text.

At 302, the method parses the response payload of the response message to obtain the correlation identifier. As discussed above, the correlation identifier may have been included in the payload of the request message sent by the producer. After consuming and processing the request message to generate the response message, the consumer may include the same correlation identifier in the response message payload such that it may be matched with the request message.

At 303, the method generates a second response routing key including the correlation identifier. In some embodiments, the correlation identifier may be concatenated with the resource routing key. Using the correlation identifier as a portion of the routing key enables the producer to subscribe to a specific queue having that correlation identifier as part of the binding key used to bind with the exchange. In this way, the producer may only receive response messages that are response to request messages that it published itself. That is, the publishers may not receive response messages that are response to other instances of the application since they are not subscribed to the queues for receiving those messages. Each producer creates their own temporary queue based on the correlation identifier for each request message.

At 304, the method may further comprise generating a second response message including the second response routing key and the response payload. This modified message has a routing key based on the correlation identifier as discussed above.

At 305, the method may send the second response message to a first message system that routes the second response message to the first producer application based on the second response routing key including the correlation identifier. Therefore, the message may be provided to the queue that is being listed to by the application that sent the corresponding request message.

In some embodiments of the method, the first message system includes a first queue bound to a first exchange using a first binding key. The first exchange may be configured to route messages including routing keys that are the same as the first binding key to the first queue. The first binding key may be the same as the second response routing key including the correlation identifier.

In some embodiments of the method, the first producer application creates the first queue based on the correlation identifier and a request binding key of the first request message. Other producer applications may not be configured to obtain messages from the first queue.

In some embodiments the method further comprises receiving a plurality of messages a plurality of queues of a second message system. In such embodiments, the subscriber application may send the first response message to the second message system and the first response message may be received from the second message system.

In some embodiments of the method, the generating of the second response routing key includes concatenating the first response routing key and the correlation identifier.

In some embodiments of the method, the routing of the second response message to the first producer application is performed using Advanced Message Queuing Protocol (AMQP). In some embodiments, the payload is formatted in JavaScript Object Notation (JSON) format and the parsing of the response payload uses a JSON parsing method.

Figure 4:
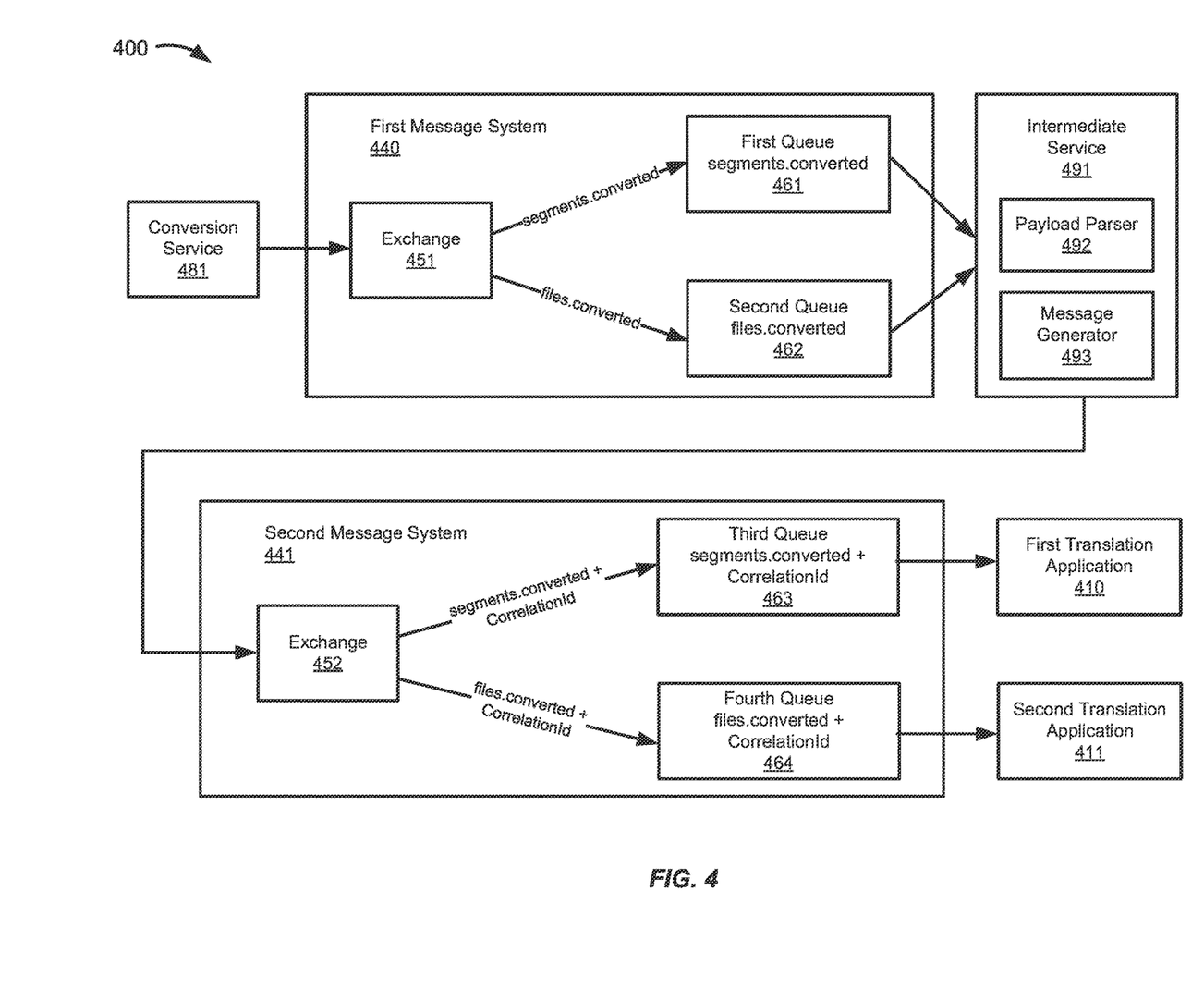
FIG. 4 shows an improved system for request-response communication using an intermediate service, according to an embodiment.

FIG. 4 shows a diagram 400 an improved system for request-response communication using an intermediate service 491, according to an embodiment. A conversion service 481 may have already received a request message and consumed the payload in order to generate a response message. The conversion service 481 sends the response message to the first message system 440, which includes a first exchange 451. The first exchange 451 is bound to a first queue 461 using "segments.converted" as the binding key. The first exchange is also bound to a second queue 462 using "files.converted" as the binding key. The first queue 461 and the second queue 462 both provide messages to the intermediate service 491. In some embodiments, all messages from the queues of the first message system 440 may be routed to the intermediate service 491 instead of being routed to their corresponding applications.

To enable each translation application 410, 411 to receive the corresponding response for the request message that it has sent, an intermediate service 491 will be used. This intermediate service 491 may receive all the messages from the conversion service 481 and extract the correlation identifier from the response messages. A new binding key may be created by concatenating or otherwise combining the binding key ("files.changed" and "files.translated" are the binding keys in this example) of the exchange and correlation identifier. The message as modified by the intermediate service 491 may be sent to the second exchange 452 (e.g., a direct exchange). Each translation application may create a queue based on its topic exchange's binding key with which it sent the request and correlation identifier and will wait for the response. This new and innovative way of creating the binding key ensures that the message is exactly sent to the correct recipient and avoids unnecessary processing of the messages in multiple instances. In the intermediate service 491, the correlation identifier extraction is done only once per message and the architectural design of "Direct Exchange" is leveraged to route the messages to the correct recipient.

The intermediate service 491 includes a payload parser 492 that parses the payloads of the messages to extra the correlation identifier ("CorrelationId"). The intermediate service 491 also incudes a message generator 493. The message generate may generate a new routing key by concatenating the original routing key with the correlation identifier. This new routing key is used for a new message that is then provide to a second message system 441.

The second message system 441 includes a second exchange 452. The second exchange 452 is bound to a third queue 462 using "segments.converted+CorrelationId" as the binding key. A first translation application 410 listens to the third queue 463. The second exchange 452 is bound to the fourth queue 464 using "files.converted+CorrelationId" as the binding key. A second translation application listens to the fourth queue 464. These queues and bindings may have been created by the corresponding application when it published the original request message. That is, the publisher takes the correlation identifier from their request message and uses it to create a temporary personal queue having a binding key based on the correlation identifier such that the application and listen to that queue and only that queue for the corresponding response message.

This technique is advantageous and efficient because the application does not need to parse and extract correlation identifiers from messages that may be for other instances of the application.

Figure 5:
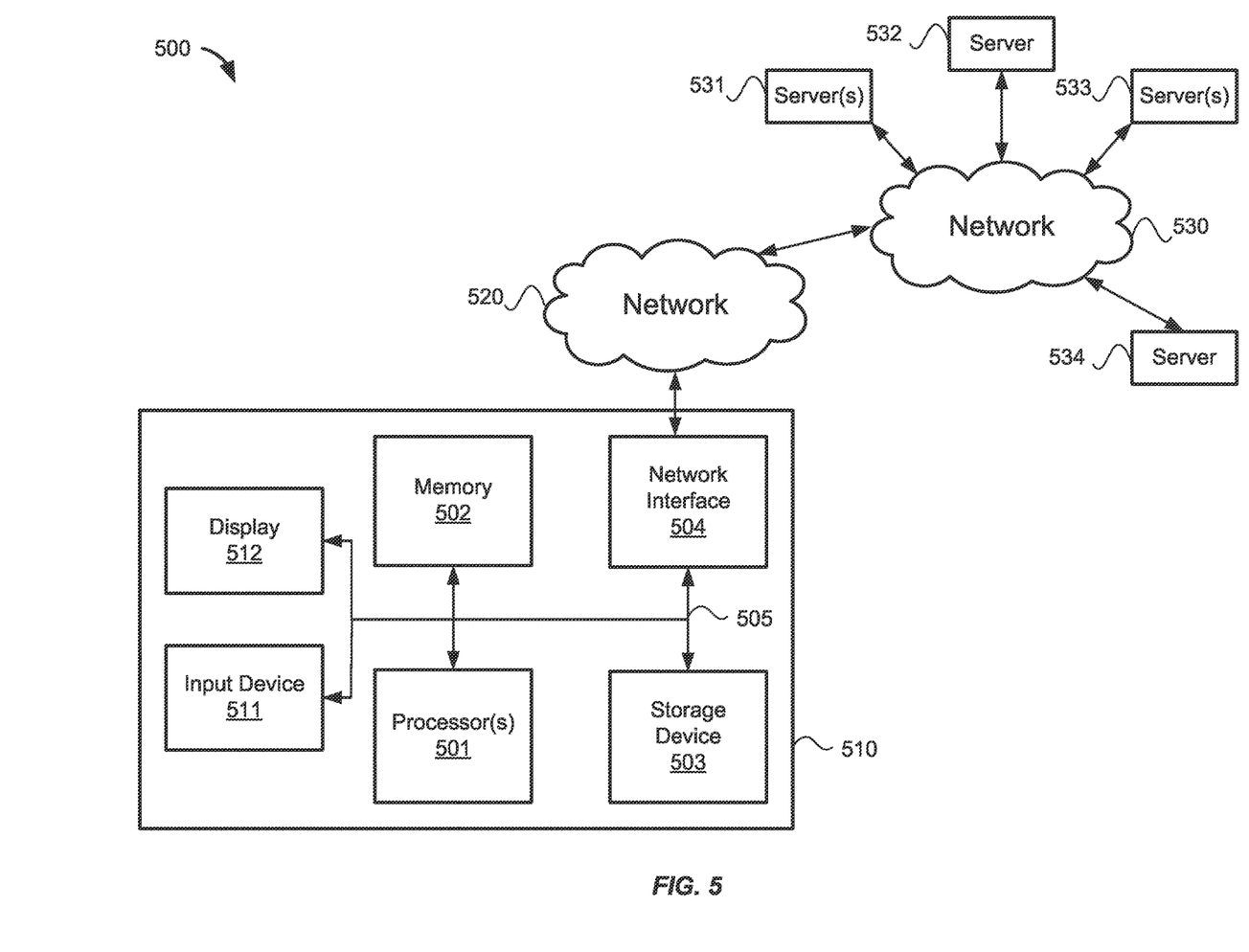
FIG. 5 shows a diagram of hardware of a special purpose computing machine for implementing systems and methods described herein.

FIG. 5 shows a diagram 500 of hardware of a special purpose computing machine for implementing the efficient response communication techniques described herein. A computer system 510 includes a bus 505 or other communication mechanism for communicating information, and one or more processors 501 coupled with bus 505 for processing information. The computer system 510 also includes a memory 502 coupled to bus 505 for storing information and instructions to be executed by processor 501, including information and instructions for performing some of the techniques described above, for example. This memory may also be used for storing programs executed by processor(s) 501. Possible implementations of this memory may be, but are not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 503 may include source code, binary code, or software files for performing the techniques above, such as the processes described above, for example. Storage device and memory are both examples of non-transitory computer readable storage mediums.

The computer system 510 may be coupled via bus 505 to a display 512 for displaying information to a computer user. An input device 511 such as a keyboard, touchscreen, and/or mouse is coupled to bus 505 for communicating information and command selections from the user to processor 501. The combination of these components allows the user to communicate with the system. In some systems, bus 505 represents multiple specialized buses, for example.

The computer system also includes a network interface 504 coupled with bus 505. The network interface 504 may provide two-way data communication between computer system 510 and a network 520. The network interface 504 may be a wireless or wired connection, for example. The computer system 510 can send and receive information through the network interface 504 across a local area network, an Intranet, a cellular network, or the Internet, for example. In the Internet example, a browser, for example, may access data and features on backend systems that may reside on multiple different hardware servers 531-534 across the network. The servers 531-534 may be part of a cloud computing environment, for example.

Additional Embodiments

Additional embodiments of the present disclosure are further described below.

One embodiment provides a computer system comprising one or more processors and one or more machine-readable medium coupled to the one or more processors. The one or more machine-readable medium storing computer program code comprising sets of instructions executable by the one or more processors. The sets of instructions executable to receive, from a subscriber application, a first response message including a first response routing key and a response payload including a correlation identifier. The first response message responsive to a first request message including the correlation identifier from a first producer application. The sets of instructions further executable to parse the response payload of the response message to obtain the correlation identifier. The sets of instructions further executable to generate a second response routing key including the correlation identifier. The sets of instructions further executable to generate a second response message including the second response routing key and the response payload. The sets of instructions further executable to send the second response message to a first message system that routes the second response message to the first producer application based on the second response routing key including the correlation identifier.

In some embodiments of the computer system, the first message system includes a first queue bound to a first exchange using a first binding key. The first exchange may be configured to route messages including routing keys that are the same as the first binding key to the first queue. The first binding key may be the same as the second response routing key including the correlation identifier. In some embodiments, the first producer application creates the first queue based on the correlation identifier and a request binding key of the first request message. In some embodiments, other producer applications are not configured to obtain messages from the first queue.

In some embodiments of the computer system, the sets of instructions further executable to receive a plurality of messages from a plurality of queues of a second message system. In such embodiments, the subscriber application sends the first response message to the second message system and the first response message is received from the second message system.

In some embodiments of the computer system, the generating of the second response routing key includes concatenating the first response routing key and the correlation identifier.

In some embodiments of the computer system, the routing of the second response message to the first producer application is performed using Advanced Message Queuing Protocol (AMQP).

In some embodiments of the computer system, the payload is formatted in JavaScript Object Notation (JSON) format and the parsing of the response payload uses a JSON parsing method.

Another embodiment provides one or more non-transitory computer-readable medium storing computer program code. The computer program code comprising sets of instructions to receive, from a subscriber application, a first response message including a first response routing key and a response payload including a correlation identifier. The first response message being responsive to a first request message including the correlation identifier from a first producer application. The computer program code further comprising sets of instructions to parse the response payload of the response message to obtain the correlation identifier. The computer program code further comprising sets of instructions to generate a second response routing key including the correlation identifier. The computer program code further comprising sets of instructions to generate a second response message including the second response routing key and the response payload. The computer program code further comprising sets of instructions to send the second response message to a first message system that routes the second response message to the first producer application based on the second response routing key including the correlation identifier.

In some embodiments of the one or more non-transitory computer-readable medium, the first message system includes a first queue bound to a first exchange using a first binding key. In such embodiments, the first exchange may be configured to route messages including routing keys that are the same as the first binding key to the first queue. In such embodiments, the first binding key may be the same as the second response routing key including the correlation identifier.

In some embodiments of the one or more non-transitory computer-readable medium, the first producer application creates the first queue based on the correlation identifier and a request binding key of the first request message, and wherein other producer applications are not configured to obtain messages from the first queue.

In some embodiments of the one or more non-transitory computer-readable medium, the computer program code further comprises sets of instructions to receive a plurality of messages a plurality of queues of a second message system. In such embodiments, the subscriber application may send the first response message to the second message system and the first response message may be received from the second message system.

In some embodiments of the one or more non-transitory computer-readable medium, the generating of the second response routing key includes concatenating the first response routing key and the correlation identifier.

In some embodiments of the one or more non-transitory computer-readable medium, the routing of the second response message to the first producer application is performed using Advanced Message Queuing Protocol (AMQP).

In some embodiments of the one or more non-transitory computer-readable medium, the payload is formatted in JavaScript Object Notation (JSON) format and wherein the parsing of the response payload uses a JSON parsing method.

Another embodiments provides a computer-implemented method. The method comprises receiving, from a subscriber application, a first response message including a first response routing key and a response payload including a correlation identifier. The first response message may be responsive to a first request message including the correlation identifier from a first producer application. The method may further comprise parsing the response payload of the response message to obtain the correlation identifier. The method may further comprise generating a second response routing key including the correlation identifier. The method may further comprise generating a second response message including the second response routing key and the response payload. The method may further comprise sending the second response message to a first message system that routes the second response message to the first producer application based on the second response routing key including the correlation identifier.

In some embodiments of the method, the first message system includes a first queue bound to a first exchange using a first binding key. The first exchange may be configured to route messages including routing keys that are the same as the first binding key to the first queue. The first binding key may be the same as the second response routing key including the correlation identifier.

In some embodiments of the method, the first producer application creates the first queue based on the correlation identifier and a request binding key of the first request message. Other producer applications may not be configured to obtain messages from the first queue.

In some embodiments the method further comprises receiving a plurality of messages a plurality of queues of a second message system. In such embodiments, the subscriber application may send the first response message to the second message system and the first response message may be received from the second message system.

In some embodiments of the method, the generating of the second response routing key includes concatenating the first response routing key and the correlation identifier.

In some embodiments of the method, the routing of the second response message to the first producer application is performed using Advanced Message Queuing Protocol (AMQP). In some embodiments, the payload is formatted in JavaScript Object Notation (JSON) format and the parsing of the response payload uses a JSON parsing method.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A computer system, comprising:
   one or more processors; and
   one or more machine-readable medium coupled to the one or more processors and storing computer program code comprising sets of instructions executable by the one or more processors to:
   receive, from a subscriber application, a first response message including a first response routing key and a response payload including a correlation identifier, the first response message responsive to a first request message including the correlation identifier from a first producer application;
   parse the response payload of the response message to obtain the correlation identifier;
   generate a second response routing key including the correlation identifier;
   generate a second response message including the second response routing key and the response payload;
   send the second response message to a first message system that routes the second response message to the first producer application based on the second response routing key including the correlation identifier.

2. The computer system of claim 1, wherein the first message system includes a first queue bound to a first exchange using a first binding key, the first exchange configured to route messages including routing keys that are the same as the first binding key to the first queue, the first binding key being the same as the second response routing key including the correlation identifier.

3. The computer system of claim 2, wherein the first producer application creates the first queue based on the correlation identifier and a request binding key of the first request message, and wherein other producer applications are not configured to obtain messages from the first queue.

4. The computer system of claim 1, wherein the computer program code further comprises sets of instructions executable by the one or more processors to:
receive a plurality of messages from a plurality of queues of a second message system, wherein the subscriber application sends the first response message to the second message system, and wherein the first response message is received from the second message system.

5. The computer system of claim 1, wherein the generating of the second response routing key including concatenating the first response routing key and the correlation identifier.

6. The computer system of claim 1, wherein the routing of the second response message to the first producer application is performed using Advanced Message Queuing Protocol (AMQP).

7. The computer system of claim 1, wherein the payload is formatted in JavaScript Object Notation (JSON) format and wherein the parsing of the response payload uses a JSON parsing method.

8. One or more non-transitory computer-readable medium storing computer program code comprising sets of instructions to:
receive, from a subscriber application, a first response message including a first response routing key and a response payload including a correlation identifier, the first response message responsive to a first request message including the correlation identifier from a first producer application;
parse the response payload of the response message to obtain the correlation identifier;
generate a second response routing key including the correlation identifier;
generate a second response message including the second response routing key and the response payload;
send the second response message to a first message system that routes the second response message to the first producer application based on the second response routing key including the correlation identifier.

9. The non-transitory computer-readable medium of claim 8, wherein the first message system includes a first queue bound to a first exchange using a first binding key, the first exchange configured to route messages including routing keys that are the same as the first binding key to the first queue, the first binding key being the same as the second response routing key including the correlation identifier.

10. The non-transitory computer-readable medium of claim 9, wherein the first producer application creates the first queue based on the correlation identifier and a request binding key of the first request message, and wherein other producer applications are not configured to obtain messages from the first queue.

11. The non-transitory computer-readable medium of claim 8, wherein the computer program code further comprises sets of instructions to:
receive a plurality of messages from a plurality of queues of a second message system, wherein the subscriber application sends the first response message to the second message system, and wherein the first response message is received from the second message system.

12. The non-transitory computer-readable medium of claim 8, wherein the generating of the second response routing key including concatenating the first response routing key and the correlation identifier.

13. The non-transitory computer-readable medium of claim 8, wherein the routing of the second response message to the first producer application is performed using Advanced Message Queuing Protocol (AMQP).

14. The non-transitory computer-readable medium of claim 8, wherein the payload is formatted in JavaScript Object Notation (JSON) format and wherein the parsing of the response payload uses a JSON parsing method.

15. A computer-implemented method, comprising:
receiving, from a subscriber application, a first response message including a first response routing key and a response payload including a correlation identifier, the first response message responsive to a first request message including the correlation identifier from a first producer application;
parsing the response payload of the response message to obtain the correlation identifier;
generating a second response routing key including the correlation identifier;
generating a second response message including the second response routing key and the response payload;
sending the second response message to a first message system that routes the second response message to the first producer application based on the second response routing key including the correlation identifier.

16. The computer-implemented method of claim 15, wherein the first message system includes a first queue bound to a first exchange using a first binding key, the first exchange configured to route messages including routing keys that are the same as the first binding key to the first queue, the first binding key being the same as the second response routing key including the correlation identifier.

17. The computer-implemented method of claim 16, wherein the first producer application creates the first queue based on the correlation identifier and a request binding key of the first request message, and wherein other producer applications are not configured to obtain messages from the first queue.

18. The computer-implemented method of claim 15, further comprising:
receiving a plurality of messages from a plurality of queues of a second message system, wherein the subscriber application sends the first response message to the second message system, and wherein the first response message is received from the second message system.

19. The computer-implemented method of claim 15, wherein the generating of the second response routing key including concatenating the first response routing key and the correlation identifier.

20. The computer-implemented method of claim 15, wherein the routing of the second response message to the first producer application is performed using Advanced Message Queuing Protocol (AMQP), wherein the payload is formatted in JavaScript Object Notation (JSON) format, and wherein the parsing of the response payload uses a JSON parsing method.

* * * * *